J. PETERSON.
PAN LIFTER.
APPLICATION FILED JULY 1, 1916.

1,273,785.

Patented July 23, 1918.

Witness
C. H. Beall
Wm. F. Davidson

Inventor
J. Peterson.
By
Attorney

UNITED STATES PATENT OFFICE.

JOHN PETERSON, OF FELCH, MICHIGAN, ASSIGNOR OF ONE-HALF TO SVAN J. PETERSON, OF FOSTER CITY, MICHIGAN.

PAN-LIFTER.

1,273,785.          Specification of Letters Patent.     Patented July 23, 1918.

Application filed July 1, 1916. Serial No. 107,051.

*To all whom it may concern:*

Be it known that I, JOHN PETERSON, a citizen of the United States, residing at Felch, in the county of Dickinson and State of Michigan, have invented certain new and useful Improvements in Pan-Lifters; and I do hereby declare the following to be a full, clear, and exact description of the invention, such as will enable others skilled in the art to which it appertains to make and use the same.

This invention relates to new and useful improvements in a pan lifter and one of its objects is the provision of a device of this character, which shall be simple, durable and efficient, and which may be manufactured and sold at a comparatively low cost.

Another object of this invention is to provide a stationary member and a pivoted member, which are adapted to grip the edges of a pan upon lifting upwardly upon the stationary member, whereby the pan may be carried from place to place without the danger of the contents of the same spilling or falling therefrom.

A further object of this invention is to provide the stationary member so bent as to form a hook, which may be employed for engaging and withdrawing the pan from within an oven of a stove so as the stationary member and movable member may readily grip the side edges of the pan when lifting upwardly upon the stationary member.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1:
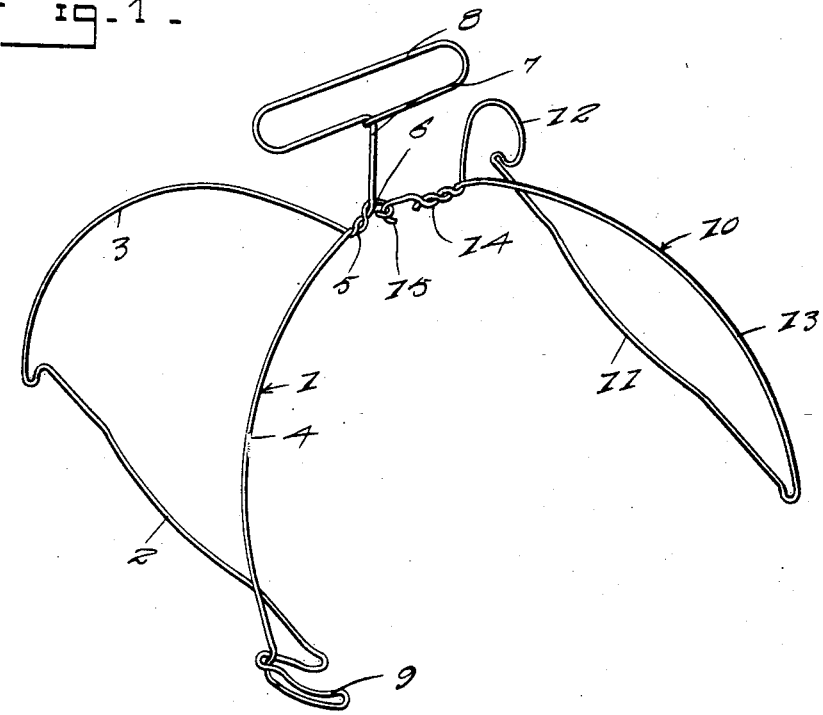
Figure 2:
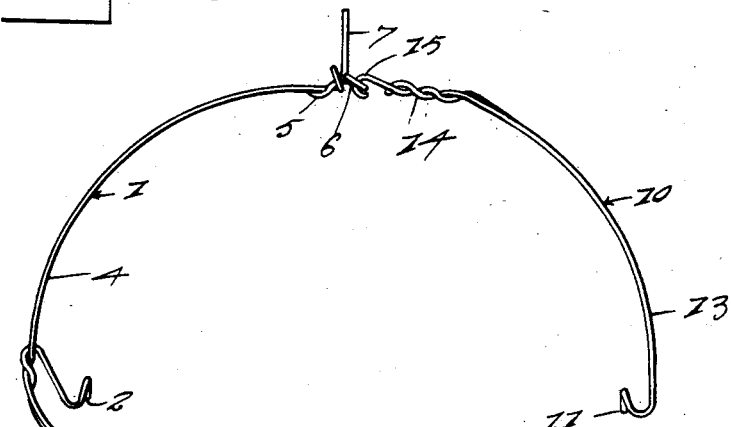

Figure 1 is a perspective view of a pan lifter, constructed in accordance with my invention, and Fig. 2 is a side elevation of the same.

Referring in detail to the drawing, the numeral 1 indicates a stationary member constructed from a continuous piece of wire. The wire being first bent to form a pan engaging member 2, the ends of which are bent outwardly and upwardly to form a pair of attaching arms 3 and 4. The attaching arm 3 being twisted about the attaching arm 4 as illustrated at 5 and the end of which is bent to form an eye 6. The attaching arm 4 after passing through the twisted end 5 of the arm 3 is bent upwardly to form a shank 7. The end of the shank 7 is bent to form a substantially rectangular handle 8 by twisting the end of the wire which constructs the handle about the shank 7 adjacent the point of the bend between the handle 8 and the shank 7. The arm 4 adjacent the pan engaging member 2 is twisted and bent to form a hook 9 for an engagement with the edge of a pan to withdraw a pan from the oven of a stove when desired.

The hook 9 may also be used to disengage the stationary member from the pan by simply grasping the hook 9 with the hand and urging the same away from the movable member 10 through the medium of the pivotal connection 15.

A movable member 10 constructed from a continuous piece of wire consists of a pan engaging member 11, the ends of which are bent outwardly and upwardly to form a pair of attaching arms 12 and 13. The attaching arm 12 being twisted about the arm 13 as illustrated at 14 to secure the arms 12 and 13 together at a point adjacent their ends. The end of the arm 13 after being twisted with the arm 12 is bent to form a hook 15 which is received by the eye 6 for pivotally securing the movable member 10 to the stationary member 1.

In operation, by lowering the stationary member 1 and the movable member 10 down over a pan and raising upwardly upon the handle 8, the movable member 10 will move in the direction of the stationary member 1 and efficiently clamp the edges of a pan so that the same may be readily lifted and conveyed from one point to another. When a pan is located within an oven of a stove for baking purposes and when desiring to withdraw the pan from the oven, by gripping the stationary member either by the handle or shank 7 and engaging the hook 9 to the sides of the pan and pulling upon the stationary member the pan will be withdrawn from the oven so that the stationary member and movable member may be readily lowered over the pan, whereby upon raising upwardly upon the handle 8 the pan will be efficiently gripped between the movable member and the stationary member.

While I have shown and described the preferred embodiment of my invention, it will be understood that minor changes in construction, combination and arrangement of parts may be made without departing from the spirit and scope of the invention as claimed.

Having thus described my invention, what I claim is:—

A pan lifter comprising stationary and movable members, each consisting of a single length of wire being first bent to form a pair of pan engaging members, the ends of said members being bent outwardly and upwardly to form pairs of attaching arms, one end of one of the arms of the stationary member being bent upon the other arm to form an eyelet, the other end of the wire being bent to form a handle, one end of one of the arms of the movable member being twisted about the other arm, the last named arm being bent to form a hook to engage the eyelet to pivot the movable and stationary members together, and one arm of the stationary member being bent upon and about itself adjacent the pan engaging member to form a hook adapted for use as means to disengage the stationary member from a pan and to hook over a pan for withdrawing it from an oven.

In testimony whereof I affix my signature in presence of two witnesses.

JOHN PETERSON.

Witnesses:
 JOHN DAHLEN,
 JOHN KORTEN.